United States Patent [19]

Nakashima et al.

[11] 4,076,220

[45] Feb. 28, 1978

[54] METHOD OF MIXING AND KNEADING CONTROL OF A RUBBER KNEADER

[75] Inventors: Katsutoshi Nakashima; Toshio Kita; Ryuzo Osawa, all of Kodaira; Takashi Hatanaka, Higashimurayama, all of Japan

[73] Assignee: Bridgestone Tire Company Limited, Kyobashi, Japan

[21] Appl. No.: 656,971

[22] Filed: Feb. 10, 1976

[51] Int. Cl.$^2$ ............................................. B29H 3/00
[52] U.S. Cl. ....................................... 366/69; 366/601
[58] Field of Search ............................... 259/185–195, 259/8, 9, 10, DIG. 2, DIG. 19, 182; 318/98, 99, 332, 474, 432, 470; 324/142; 137/4, 92; 235/151.2

[56] References Cited

U.S. PATENT DOCUMENTS

| | | | |
|---|---|---|---|
| 2,452,142 | 10/1948 | Pecker | 259/8 |
| 3,951,389 | 4/1976 | Porter | 259/DIG. 19 |

Primary Examiner—Harvey C. Hornsby
Assistant Examiner—Robert Pous
Attorney, Agent, or Firm—Haseltine, Lake & Waters

[57] ABSTRACT

A method of mixing and kneading control of a rubber kneader comprising the steps of detecting the plasticity of a rubber raw material after the rubber raw material and additives are put into a receptacle of the rubber kneader, and controlling total energy spent by the electric motor of the rubber kneader and total revolutions of a mixing and kneading rotor of the rubber kneader in correspondence with the detected plasticity of the rubber raw material.

2 Claims, 6 Drawing Figures

METHOD OF MIXING AND KNEADING CONTROL OF A RUBBER KNEADER

FIELD OF THE INVENTION

This invention relates to a method of mixing and kneading control of a rubber kneader which mixes and kneads a rubber raw material and additives such as particles of carbon black and so on, and more particularly to a method of controlling the kneader so as to bring the rubber plasticity and carbon black particles dispersibility into desirable values.

BACKGROUND

It was conventionally a common practice to mix and knead the rubber raw material including, for example, a natural rubber and a synthetic rubber with a predetermined distribution rate involving carbon black, particles sulphur and so on in a rubber kneading machine called a Banbury mixer in the rubber industry so as to produce a variety of rubber products. For example, it is well known that a kneaded rubber for rubber tires is required to have uniform plasticity and dispersibility of the additives therein to enhance the quality of the individual finished tire.

In order to obtain such a kneaded rubber with excellent tire quality, a control method of the rubber kneader has generally been carried out in such a manner that a certain volume of the rubber raw material and the additives is kneaded on trial on the basis of a distribution table so as to seek optimum standard values of kneading period and temperature and an operator thereafter controls the rubber kneader in accordance with the foregoing optimum standard values. The plasticity of the kneaded rubber and the dispersibility of the additives did not have respective desired values causing great irregularity even if the rubber raw material and the additives are kneaded and mixed on the basis of the trial operation by the reasons of irregularity of a distribution rate between the rubber raw material and the additives, abrasion of the kneading rotor, and fluctuation of the operational conditions such as rotational speed of the rotor and the temperature of the machine. As a result of this, the production of intermediate tire products such as tire treads and rubberized cord fabrics with the kneaded rubber with such a great irregularity results in unevenness in rubber weight per unit volume of the intermediate tire product, thereby causing unbalance in weight to the finished tire and thus decreasing steerability of vehicles. On the other hand, the irregularity of the plasticity of the kneaded rubber requires tedious arrangement of extruding dies and thus deteriorates operational efficiency by the reasons that a tire tread is extruded through the die which is so designed in its shape as to bear in mind a specified plasticity. The great irregularity of the dispersibility also deteriorates abrasion and fatigue rates of the tire, resulting in decreasing longevity of the tire.

FIG. 1 graphically shows the plasticity of the kneaded rubber and the electric energy spent during the mixing and kneading operation of the same kind of rubber raw material in a conventional manner. As will be seen from FIG. 1, the plasticity is designated to have great irregularity in spite of almost constant electric energy spent by the rubber kneader. The fact that the electric energy has relatively small irregularity compared with the plasticity is due to the reason that the operator manages to control the rubber kneader for obtaining a desired or predetermined plasticity of the kneaded rubber relying on his experience and sense while watching the development of conditions such as temperatures and mixing time of the kneaded rubber. It is generally well known in the art that the dispersibility of the carbon black particles in the kneaded rubber becomes more preferable by making the kneading time longer while being brought about irregularity depending upon the plasticity of the rubber raw material by making the kneading time shorter, on the assumption that the revolutions of the kneading rotor of the kneader is controlled almost constant. According to the conventional manner, the dispersibility of the carbon black particles is therefore not always satisfactory even if the rubber raw material is controlled to have a desired plasticity.

SUMMARY OF THE INVENTION

It is therefore an object of the present invention to provide a method of mixing and kneading control of a rubber kneader so as to make both the plasticity and the dispersibility satisfactory.

It is another object of the present invention to provide a method of producing a optimum kneaded rubber for tire treads so as to enhance the quality of the finished tire.

These objects of the present invention are attained by a method comprising the steps of detecting the plasticity of a rubber raw material after the rubber raw material and additives are put into a receptacle of a rubber kneader, and controlling total electric energy spent by an electric motor of the rubber kneader and total revolutions of a mixing and kneading rotor of the rubber kneader correspondingly to the detected plasticity of the rubber raw material.

BRIEF DESCRIPTION OF THE DRAWING

The features and advantages of the method according to the present invention will become more apparent from the following description taken in conjunction with the accompanying drawings, in which.

DETAILED DESCRIPTION

A method of mixing and kneading control of the present invention will now be discussed hereinafter with reference to a conventional method.

A following equation is generally given concerning the plasticity of the kneaded rubber controlled by the conventional method, $$ML = F_1(W, T) \tag{1}$$

in which ML denotes the plasticity of the kneaded rubber, W total electric energy spent during the kneading and mixing operation, and T temperature of the kneaded rubber during the kneading and mixing operation.

As will be understood from the above mentioned equation, the plasticity ML of the kneaded rubber is a function of the total electric energy W spent during the kneading and mixing operation and the temperature T of the kneaded rubber during the kneading and mixing operation with a function $F_1$ corresponding to distribution of the natural and synthetic rubbers. It is generally to be understood that the components of the rubber raw material is mechanically broken below a temperature T of 120° C, while in chemically broken over a temperature T of 120° C. It is therefore considered that the temperature T is a function of the total electric energy W below 120° C and is a function affecting the plasticity ML over 120° C. Through our repeated experiments a critical temperature of 140° C has been found in place of 120° C which temperature is deemed to be a theoretical value.

Figure 1:
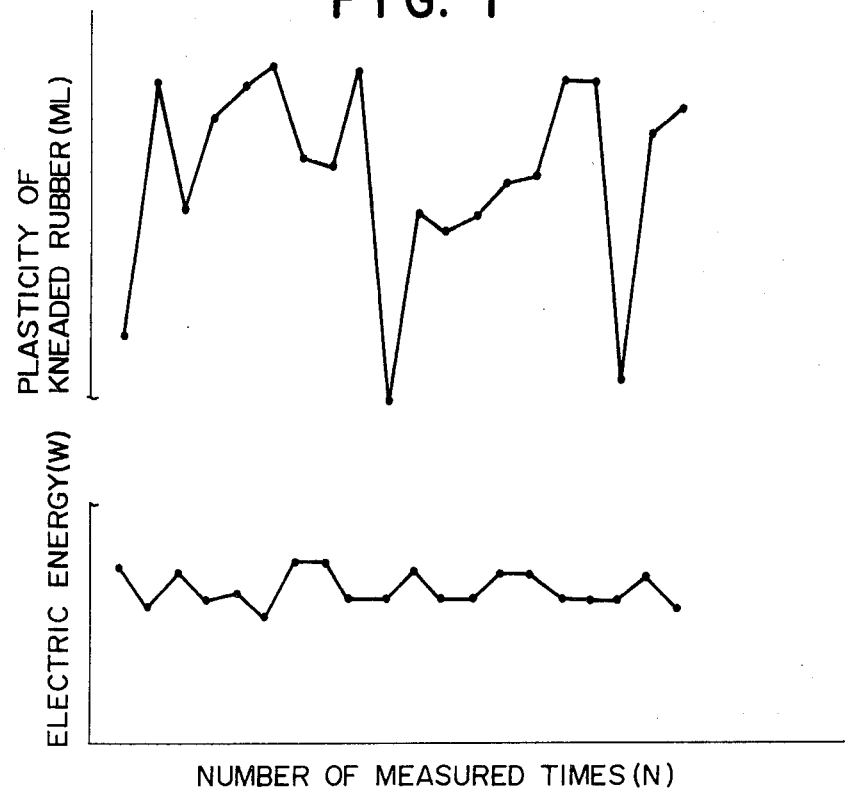
FIG. 1 is a graph showing the irregularity of the plasticity of the kneaded rubber in a conventional method in relation with electric energy spent by an electric motor for driving a kneading motor in the rubber kneader.
Figure 2:
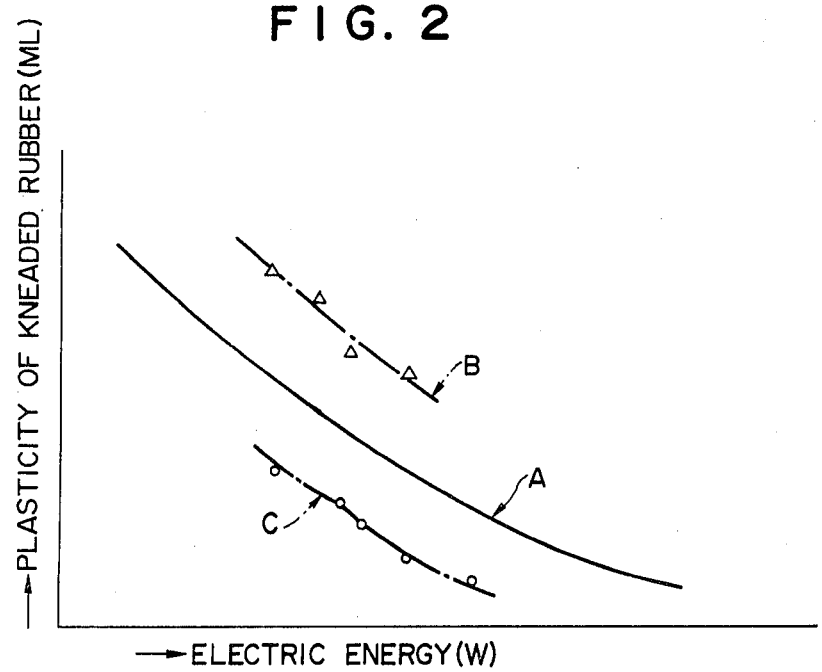
FIG. 2 is a graph showing relation between the plasticity of the kneaded rubber and the electric energy in the conventional method.
Figure 3:
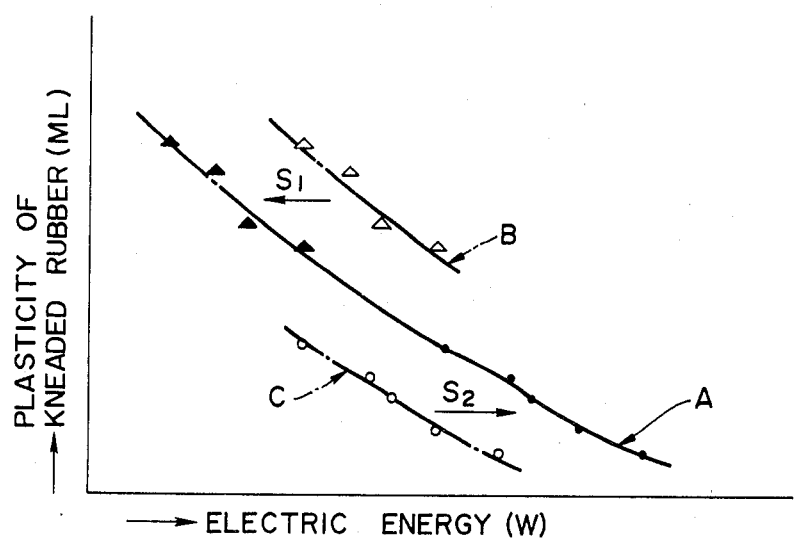
FIG. 3 is a similar graph to FIG. 2 but showing a shifting way of the relation between the plasticity of the kneaded rubber and the electric energy in the conventional method.

FIG. 2 is a graph showing data obtained through experiments on the basis of the equation (1). In FIG. 2, there is shown irregularity lines of the plasticity under the same electric energy as seen from triangular and round marks.

A line designated at A is a desired plasticity of the kneaded rubber predetermined on the basis of a certain rubber raw material, while each of lines designated at B and C shows plasticity of the kneaded rubber with the irregularity relative to the desired plasticity. It is therefore to be apparent from the above fact that it is almost impossible to obtain a desired plasticity of the kneaded rubber only using the equation (1). It will be also appreciated that if the lines B and C are shifted to the line A by respective shift amounts $S_1$ and $S_2$ the lines B and C overlap the line A. Following equations will be given from the foregoing discussion.

$$ML = F_1(W_1, T)$$

$$W_1 = F_2(Si)$$

Hence, $$ML = F_1\{F_2(Si), T\} \tag{2}$$

A following equation is found through our various experiments in pursuit of relation between the shift coefficient Si and the plasticity of the rubber raw material $ML_o$.

$$Si = F_3(ML_o) \tag{3}$$

Figure 4:
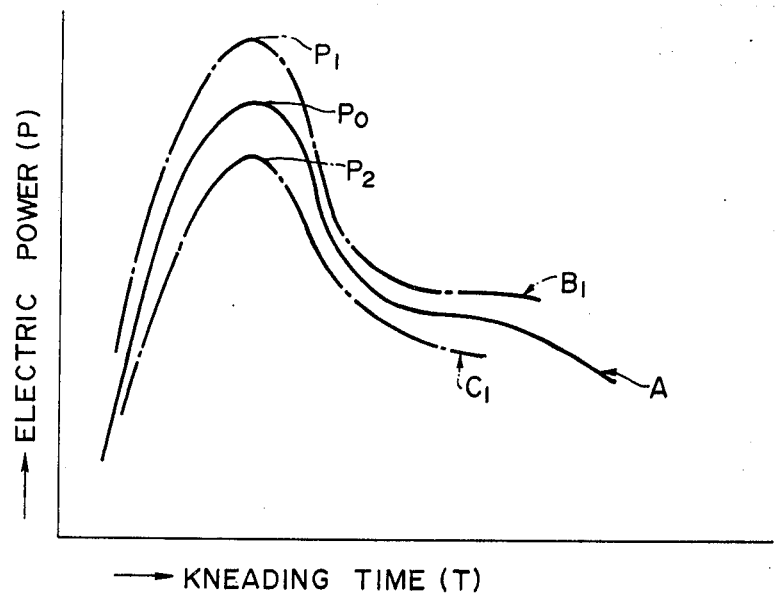
FIG. 4 is a graph showing electric peak powers in relation with kneading time.

The rubber kneader is thus proved to be controlled by the above equations (2) and (3), however, it is required to find the plasticity $ML_o$ of the rubber raw material. According to the results of our various experiments, it is found that a peak electric power takes place in the electric energy spent by the kneading rotor several seconds after the start of the kneading and mixing operation, which peak electric powers $P_1$ and $P_2$ correspond to the plasticity $ML_o$. Further, the plasticity will therefore be able to be designated by a following equation in accordance with the graph of FIG. 4.

$$ML_o = F_4(Pi) \tag{4}$$

It is therefore found that there is almost no irregularity in the plasticity and the dispersibility if the rubber kneader is controlled in an attempt to obtain the plasticity of the kneaded rubber by the above equations (2), (3) and (4).

On the other hand, the dispersibility of the carbon black particles is generally known as represented a following equation, $$M = F_5(R \times t) \tag{5}$$

in which M designates the dispersibility of the carbon black particles in the kneaded rubber, R revolutions of the kneading rotor and t kneading time.

Figure 5:
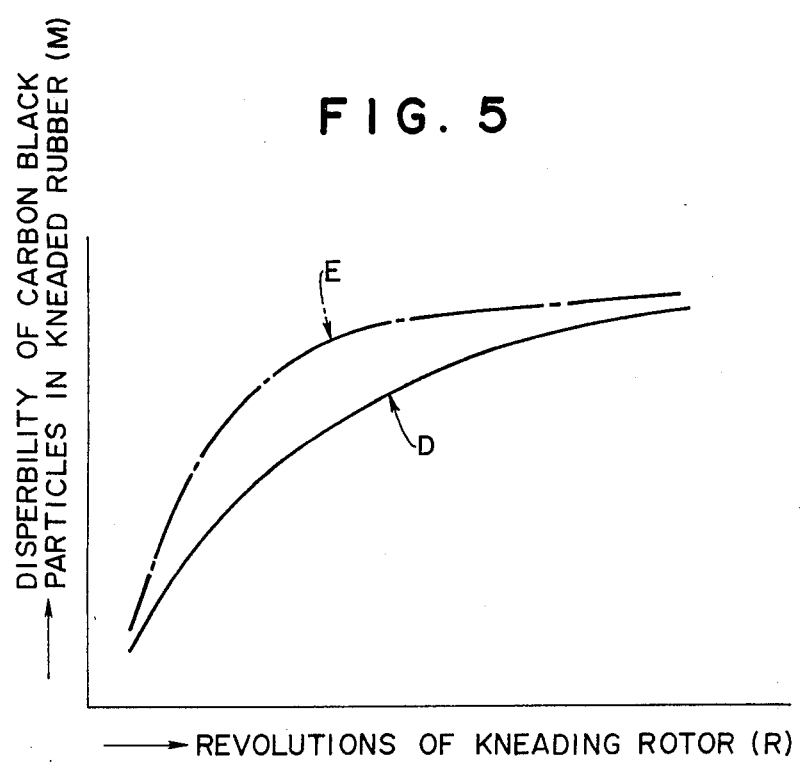
FIG. 5 is a graph showing the dispersibility of the carbon black particles in the kneaded rubber in relation with revolutions of the kneading rotor.

From the above equation (5), the dispersibility M of the carbon black particles is determined by the total revolutions of the kneading rotor. It will be apparent from FIG. 5 that the dispersibility M is affected by the plasticity $ML_o$ of the rubber raw material. A line D designates a dispersibility to be obtained on the basis of the standard plasticity of the rubber raw material, while a line E represents a dispersibility corresponding to irregularity of the plasticity of the rubber raw material.

From the foregoing description, it will be proved that the rubber kneader is required to be controlled in consideration of the plasticity $ML_o$ of the rubber raw material without simply using the equation (5) in order to obtain a desirable dispersibility of the carbon black particles. Therefore, the equation (5) is modified with the plasticity $ML_o$ to give a following equation.

$$M = F_5(R \times t, ML_o) \tag{6}$$

It will be finally understood that the rubber kneader should be controlled on the basis of the equations (2) (3) (4) and (6) in an attempt to give desirable plasticity and dispersibility to the kneaded rubber.

Figure 6:
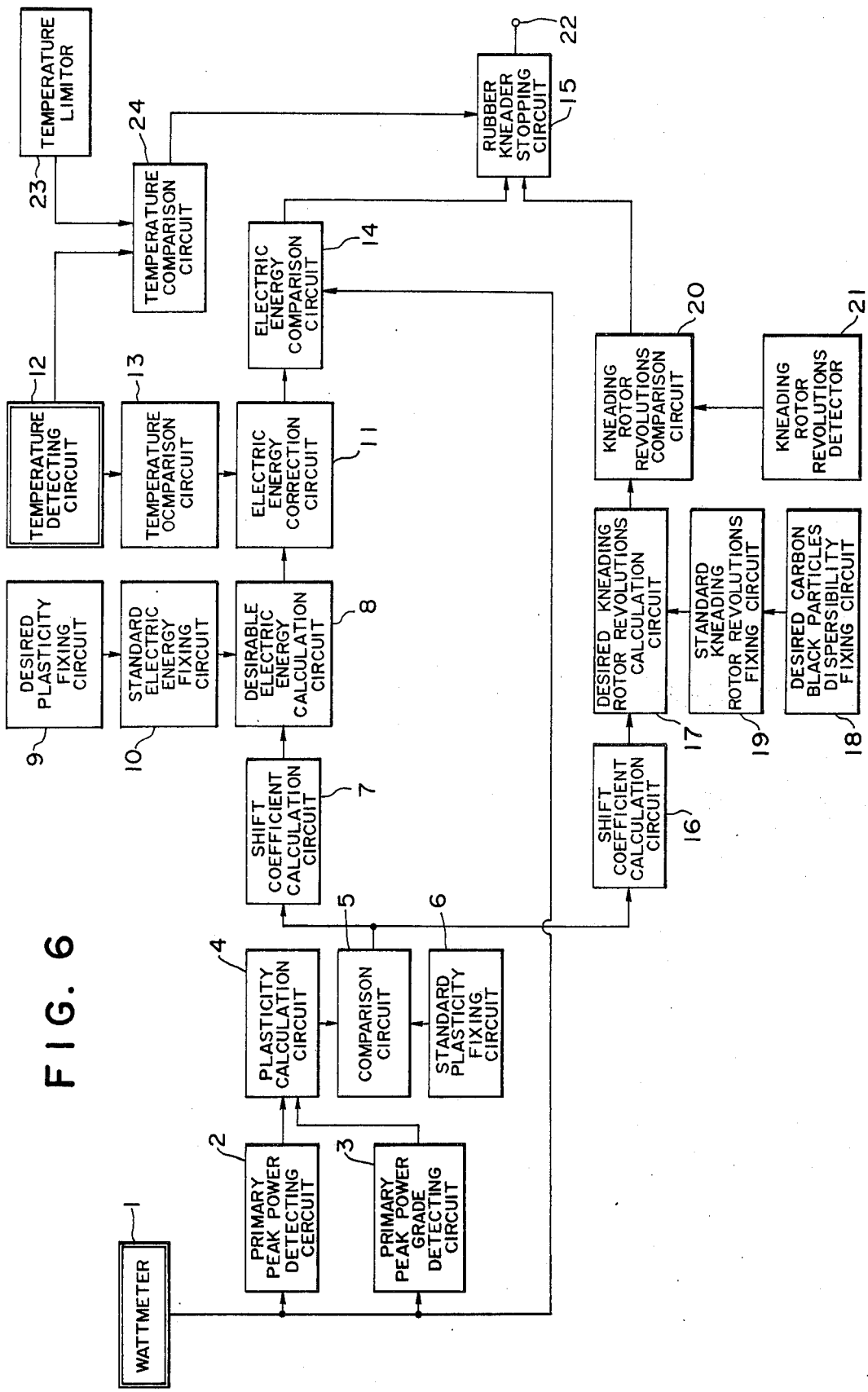
FIG. 6 is a block diagram showing control circuits of a rubber kneader embodying the present invention.

A method of mixing and kneading control of a rubber kneader will now particularly described hereinlater with reference to a diagram shown in FIG. 6.

The reference numeral 1 designates a wattmeter which detects electric power spent by the rubber kneader and generates DC voltage output signal. The wattmeter 1 is adapted to be actuated simultaneously upon the start of the kneading and mixing operation of the rubber raw material and additives such as carbon black particles received in the receptacle of the rubber kneader. The output signal of the wattmeter 1 is then fed to a primary peak power detecting circuit 2 and a primary peak power grade detecting circuit 3. When a peak power appears several seconds after the start of the mixing and kneading operation, the circuits 2 and 3 instantly detect the peak power and its grade to produce respective DC voltage output signals to a plasticity calculation circuit 4 for the rubber raw material. The plasticity calculation circuit 4 calculates the plasticity $ML_o$ of the rubber raw material by the output signals of the peak power and the peak grade from the circuits 2 and 3. The calculation result is then fed to a comparison circuit 5 which is preliminary given an average standard plasticity of the rubber raw material by a standard plasticity fixing circuit 6. The plasticity $ML_o$ of the rubber raw material calculated by the calculation circuit 4 is compared with the standard plasticity of the rubber raw material in the comparison circuit 5. The compared result is designated as a deviation between the plasticity $ML_o$ of the rubber raw material and the standard plasticity. A shift coefficient Si is then calculated in a shift coefficient calculation circuit 7 on the basis of the above deviation. The output signal of the shift coefficient Si calculated by the circuit 7 is then fed to a desirable electric energy calculation circuit 8, which is preliminarily given a desired total electric energy W required for kneading and mixing through a desired plasticity fixing circuit 9 and a standard electric energy fixing circuit 10, and where an desired total electric energy $W_1$ is calculated. When the total electric energy $W_1$ is calculated by the calculation circuit 8, an output signal of the calculation circuit 8 is fed to an electric energy correction circuit 11 which is electrically connected to a temperature detecting circuit 12 through a temperature comparison circuit 13. The correction circuit 11 is adapted to directly feed an output signal, the same as the signal of the calculation circuit 8, to an electric energy comparison circuit 14 when the temperature is registered below 140° C, while being adapted to give a temperature coefficient to the output signal from the calculation circuit 8 for correction of the total electric energy $W_1$ when the temperature is registered over 140° C. The electric energy comparison circuit 14 is normally supplied with electric energy detected by the wattmeter 1 and compares the detected electric energy with the output signal from the electric energy correction circuit 11 to produce a coincided output signal to a rubber kneader stopping circuit 15.

On the other hand, the deviation signal produced by the comparison circuit 5 is also supplied to an additional shift coefficient calculation circuit 16 which is adapted to calculate a shift coefficient of dispersibility M on the basis of the deviation and to feed a shift coefficient signal to a desired kneading rotor revolutions calculation circuit 17. Certain revolutions R of the kneading rotor is preliminary given to the calculation circuit 17 through a desired carbon black particles dispersibility fixing circuit 18 and a standard kneading rotor revolutions fixing circuit 19 so that the calculation circuit 17 calculates the signals from the calculation circuit 16 and the revolutions fixing circuit 19 to feed an output signal to a kneading rotor revolutions comparison circuit 20. A kneading rotor to feed an output signal to the comparison circuit 20 which produces a coincided signal to the rubber kneader stopping circuit 15 after calculating the signals from the calculation circuit 17 and the revolutions detector 21. The stopping circuit 15 produces a stop signal to an input terminal 22 on a control panel for stopping the rubber kneader upon reception of the signals from the comparison circuits 14 and 20. At this time, the plasticity $ML_o$ of the kneaded rubber and the dispersibility M of the carbon black particles are under desired values. A temperature comparison circuit 24 is adapted to receive signals from the temperature detecting circuit 12 and a temperature limiter 23 so as to produce another stopping signal to the stopping circuit 15 upon an excessive high temperature taking place in the kneaded rubber in the receptacle of the rubber kneader. As a result, the stopping circuit 15 stops the rubber kneader upon reception of the stopping signal from the temperature comparison circuit 24 so that the kneaded rubber is prevented from being burnt during the kneading and mixing operation.

While it has been described in the above embodiment of the present invention that the peak power and peak grade are detected by the detecting circuits 2 and 3 for measurement of the plasticity of the rubber raw material, a suitable viscometer may be employed to measure viscosity of the rubber raw material prior to throwing them into the receptacle of the rubber kneader for the purpose of making the viscosity an input signal of the comparison circuit 5. The plasticity ML of the kneaded rubber may be controlled in proportion to the dispersibility M of the carbon black particles such as, for example, the plasticity rate 100 to the dispersibility rate 80 if desired.

From the above detailed description, it is to be understood that there is less irregularity in the plasticity of the kneaded rubber while the dispersibility of the carbon black particles being more enhanced in the method according to the present invention in comparison with the conventional method. Further, the rubber kneader can be controlled without operator's experience and sense thus far necessitated, causing an enhanced operational efficiency and bringing about excellent quality of finished tires.

What is claimed is:

1. A method of mixing and kneading control of a rubber kneader, comprising the steps of:

placing rubber raw material and additives into a receptacle for working by said rubber kneader through electric motor means;

detecting the plasticity of said rubber raw material as a peak electric power;

comparing said detected peak electric power by a comparison circuit with a predetermined standard peak electric power; seeking deviation between said two peak electric powers for calculation of a shift coefficient; and controlling total electric energy in relation to said shift coefficient to be spent by said electric motor means of said rubber kneader and total revolutions of said shift coefficient of a mixing and kneading rotor of said rubber kneader corresponding to the detected plasticity of said rubber raw material.

2. A method as set forth in claim 1, including the steps of: stopping said rubber kneader when it simultaneously receives an electric signal produced upon spending a desired total electric energy in relation to said shift coefficient and an additional electrical signal produced upon rotation to desired total revolutions involving said shift coefficient.

* * * * *